United States Patent
Asano et al.

(10) Patent No.: US 6,790,494 B2
(45) Date of Patent: Sep. 14, 2004

(54) HEAT INSULATING AND SHIELDING GLASS PANEL

(75) Inventors: Osamu Asano, Osaka (JP); Terufusa Kunisada, Osaka (JP); Tetsuo Minaai, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 13 days.

(21) Appl. No.: 10/332,692

(22) PCT Filed: May 15, 2002

(86) PCT No.: PCT/JP02/04699

§ 371 (c)(1),
(2), (4) Date: Mar. 21, 2003

(87) PCT Pub. No.: WO02/092529

PCT Pub. Date: Nov. 21, 2002

(65) Prior Publication Data

US 2004/0028845 A1 Feb. 12, 2004

(30) Foreign Application Priority Data

May 15, 2001 (JP) .......................... 2001-144132

(51) Int. Cl.[7] .............................. E08B 3/24; E04C 2/54
(52) U.S. Cl. .................... 428/34; 428/432; 52/786.1; 52/686.13
(58) Field of Search ................ 428/34, 428, 432, 428/913; 52/204.5, 786.1, 786.13

(56) References Cited

U.S. PATENT DOCUMENTS

| | | | |
|---|---|---|---|
| 5,124,185 A | * | 6/1992 | Kerr et al. .................. 428/34 |
| 5,128,181 A | * | 7/1992 | Kunert ......................... 428/34 |
| 5,154,953 A | * | 10/1992 | de Moncuit et al. .......... 428/34 |
| 5,156,894 A | * | 10/1992 | Hood et al. .................. 428/34 |
| 6,048,621 A | * | 4/2000 | Gallego et al. ............. 428/432 |

FOREIGN PATENT DOCUMENTS

| | | |
|---|---|---|
| EP | 1030023 | 8/2000 |
| JP | 6-94377 | 11/1994 |
| JP | 6-102557 | 12/1994 |
| JP | 10-236848 | 9/1998 |
| JP | 2882728 | 2/1999 |
| JP | 2000-87656 | 3/2000 |
| JP | 2000-103651 | 4/2000 |
| KR | 2001-0031807 | 4/2001 |

* cited by examiner

*Primary Examiner*—Donald J. Loney
(74) *Attorney, Agent, or Firm*—Merchant & Gould P.C.

(57) ABSTRACT

A heat insulating/heat shielding glass panel is produced by forming a functional film on a sheet of plate glass, which film is high in solar radiation reflectance, small in solar radiation absorptivity, and has emissivity of 0.20 or less, superposing another sheet of plate glass on the side of the functional film, and adhesively sealing the two sheets of plate glass, under the condition that a gap layer is provided between the two sheets of plate glass. Accordingly, there is obtained a glass panel which has a sufficient heat insulating performance and a sufficient heat shielding performance, and in which no warping is generated even when suffering the solar radiation.

13 Claims, 2 Drawing Sheets

HEAT INSULATING AND SHIELDING GLASS PANEL

This application is a 371 of PCT/JP02/04699 filed May 15, 2002.

TECHNICAL FIELD

The present invention relates to glass panels provided with heat insulating performance and heat shielding performance optimal for use as windowpanes in buildings.

BACKGROUND ART

A need for the high heat shielding performance of the opening portions in a house has grown year by year. According to the standard of the performance indication for the double layer glass for use in houses presented by "High Performance Glass Promotion Conference," it is required that the solar radiation heat gain ratio be 0.51 (this value means that the solar radiation heat of 51 units reaches the indoor space based on the solar radiation heat of 100 units) or below. Additionally, according to the next generation energy conservation standard publicized as an announcement from Ministry of International Trade and Industry and Ministry of Construction in March of 2000, it is required that the solar radiation heat gain ratio in any of the districts III, IV, and V be 0.49 (this value means that the solar radiation heat of 49 units reaches the indoor space based on the solar radiation heat of 100 units) or below, which ratio being more preferable.

As a measure for improving the heat shielding performance of the window portions of a house, the heat ray absorbing glass has come into use recently. For example, Japanese Patent Publication No. 6-94377 and Japanese Patent Publication No. 6-102557 disclose respective types of heat ray absorbing glass based on the combinations of special metal oxides.

Additionally, nowadays, double layer glass panels have been developed which have not only the heat shielding capability but also heat insulating capability. For example, Japanese Patent No. 2882728 discloses a double layer glass panel in which a sheet of colored heat ray absorbing glass is arranged on the outdoor side thereof, a sheet of clear type glass is arranged on the indoor side thereof, and a layer of low emissivity film is formed on the indoor side of the sheet of colored heat ray absorbing glass placed outside the room.

The above described double layer glass panel makes a too thick paned window glass, because it is necessary to acquire a thickness of 6 mm or more for the air layer (or a gas layer such as an argon gas layer) between the two sheets of glass, in order to acquire a heat insulating property. For example, when the thickness values of the glass sheets are each 3 mm, and the thickness of the air layer is 6 mm, the thickness of the windowpane amounts to even 12 mm, so that it can hardly be used in a common house. Accordingly, a vacuum glass panel has been developed which is provided with a very thin vacuum layer of the order of 0.2 mm in thickness interposed between the two sheets of plate glass being the same in constitution as those in the above described double layer glass panel.

This type of vacuum glass panel gives a sufficiently thin windowpane, and moreover suppresses the ingression of the solar radiation heat into the interior of a room in the hot summer daytime, and does not lose the coolness provided by a chiller against the exterior in the nighttime, so that the cooling efficiency is improved due to the effect of the heat ray absorbing glass and the low emissivity film. Additionally, this type of vacuum glass panel also improves the heating efficiency in winter, and hence comes into widespread use as an energy conservation type windowpane.

The above described type of vacuum glass panel has a weak point that it is warped on receiving the solar radiation. When the rigidity of the window sash is strong, no problem occurs; when it is not sufficiently strong, the sash frame is also warped by the effect of the glass panel warping, so that the operation of opening and closing becomes unsmooth, and there is a fear that in an extreme case the sash frames chafe against each other to be abraded by each other.

The mechanism of the warping can be interpreted as follows. When a windowpane receives the sunlight, the sheet of the heat ray absorbing glass on the outdoor side absorbs the solar radiation energy with the resulting temperature rise and thermal expansion. On the other hand, the indoor side sheet of plate glass is low in heat ray absorption function and in addition the solar radiation energy is absorbed by the heat ray absorbing glass, so that the temperature rises very slightly and accordingly the thermal expansion is very small. Additionally, the vacuum glass panel is composed of two sheets of plate glass with the peripheral portions thereof adhesively sealed and fixed using hard materials such as a low-melting glass and a solder. Accordingly, the difference in thermal expansion between the two sheets of plate glass gives rise to the wrapping on the basis of the same principle as that in bimetal.

Incidentally, in the double layer glass panel, a soft material is used as the adhesive sealing material, and accordingly the difference in thermal expansion between the two sheets of plate glass is absorbed by the deformation of the adhesive sealing material, without involving the generation of the warping.

DISCLOSURE OF THE INVENTION

An object of the present invention is to provide a glass panel in which heat insulating performance and heat shielding performance are so sufficient that no warping is generated even on receiving the solar radiation.

For the purpose of achieving the above described object, the heat insulating/heat shielding glass panel of the present invention is a heat insulating/heat shielding glass panel constituted so as to partition an indoor space and an outdoor space, by forming a gap layer with a predetermined spacing between a pair of sheets of plate glass, and a sealed periphery portion all along the peripheries of the two sheets of plate glass so that the gap layer is sealed into a reduced pressure state, in which a functional film having an emissivity of 0.20 or less is formed on the surface, in contact with the gap layer, of the outdoor side sheet of plate glass of the two sheets of plate glass; the solar radiation reflectance is 45% or less, the solar radiation absorptivity thereof is 25% or less; and the following relation holds: the solar radiation absorptivity$\geq(-1.02)\times$the solar radiation reflectance$+48.5$ (the solar radiation gain ratio$\leq 0.51$).

Additionally, as for the above inequality, the following alternative relation holds: the solar radiation absorptivity$\geq(-1.11)\times$the solar radiation reflectance$+52.5$ (the solar radiation gain ratio$\leq 0.49$).

FIG. 3 is a graph showing the relationship between the solar radiation absorptivity and the solar radiation reflectance; in a sheet of plate glass provided with a functional film 5 of the preset invention, the solar radiation reflectance thereof is 45% or less, the solar radiation absorptivity thereof is 25% or less, and the following relation holds: the solar radiation absorptivity$\geq(-1.02)\times$the solar radiation reflectance+48.5. In this connection, for either the solar radiation absorptivity or the solar radiation reflectance, there are two modes: one is the absorptivity (or reflectance) as observed from the film surface side, and the other is the absorptivity (or reflectance) as observed from the surface of the sheet of plate glass, both being a little different from each other; in the present invention, any one of these two absorptivities (or reflectances) has only to satisfy the above inequality.

The grounds for the above numerical restrictions are as follows:
(1) In the range where the above inequality does not hold, the solar radiation heat gain ratio of 0.51 or less cannot be achieved.
(2) With the solar radiation absorptivity exceeding 25%, the effect of the present invention cannot be obtained, because the warping is generated owing to the increased temperature difference, on receiving the solar radiation, between the two sheets of plate glass. The solar radiation absorptivity is preferably 20% or less, and more preferably 15% or less.
(3) With the solar radiation reflectance exceeding 45%, the visible light reflectance is often and simultaneously increased so that the dazzling appearance due to reflection is augmented, and the plate glass concerned is not suitable for use as a windowpane in a house.

By adopting the above described constitution, the thermal expansion of the outdoor side sheet of plate glass when receiving the solar radiation can be suppressed, and the solar radiation heat gain ratio of 0.51 or less can be achieved.

FIG. 4 is a graph showing the relationship between the solar radiation absorptivity and the solar radiation reflectance; in a sheet of plate glass provided with a functional film 5 of the preset invention, the solar radiation reflectance thereof is 45% or less, the solar radiation absorptivity thereof is 25% or less, and the following relation holds: the solar radiation absorptivity$\geq(-1.11)\times$the solar radiation reflectance+52.5. In this connection, for either the solar radiation absorptivity or the solar radiation reflectance, there are two modes: one is the absorptivity (or reflectance) as observed from the film surface side, and the other is the absorptivity (or reflectance) as observed from the surface of the glass plate, both being a little different from each other; in the present invention, any one of these two absorptivities (or reflectances) has only to satisfy the above inequality.

The grounds for the above numerical restrictions are as follows:

In the range where the above inequality does not hold, the solar radiation heat gain ratio of 0.49 or less cannot be achieved.

With the solar radiation absorptivity exceeding 25%, the effect of the present invention cannot be obtained, because the warping is generated owing to the increased temperature difference, on receiving the solar radiation, between the two sheets of plate glass. The solar radiation absorptivity is preferably 20% or less, and more preferably 15% or less.

With the solar radiation reflectance exceeding 45%, the visible light reflectance is often and simultaneously increased so that the dazzling appearance due to reflection is augmented, and the plate glass concerned is not suitable for use as a windowpane in a house.

By adopting the above described constitution, the thermal expansion of the outdoor side sheet of plate glass when receiving the solar radiation can be suppressed, and the solar radiation heat gain ratio of 0.49 or less can be achieved.

As the above described functional film displaying the above described characteristics, there can be proposed a constitution obtained by laminating a dielectric layer and a metal layer, for example, in such a way that a first dielectric layer, a metal layer, and a second dielectric layer are formed in the order of description on the surface of a sheet of plate glass; wherein the first dielectric layer is from 10 to 90 nm in thickness, the metal layer is from 10 to 18 nm in thickness, and the second dielectric layer is from 10 to 60 nm in thickness.

BEST MODE FOR CARRYING OUT THE INVENTION

Figure 1:
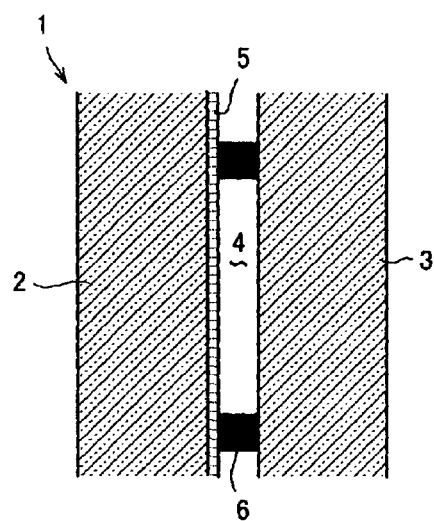
FIG. 1 is a sectional view showing an example of the heat insulating/heat shielding glass panel of the present invention.
Figure 2:
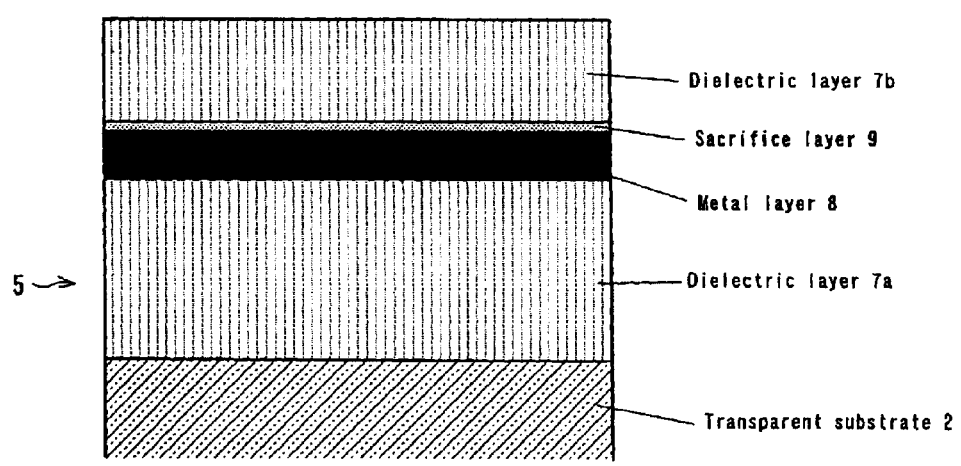
FIG. 2 is a sectional view of the lamination structure of a functional film related to an example of the present invention.
Figure 3:
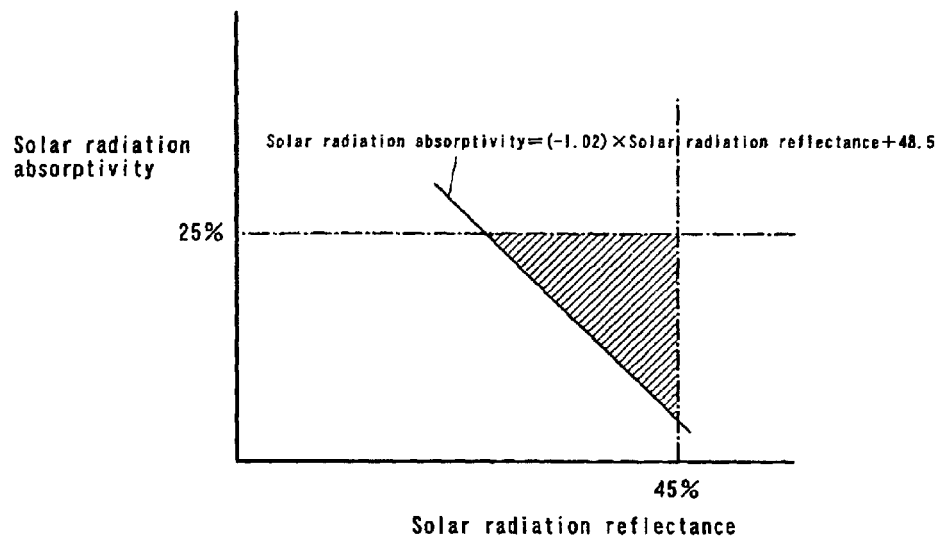
FIG. 3 is a graph showing the relationship between the solar radiation absorptivity and the solar radiation reflectance.
Figure 4:
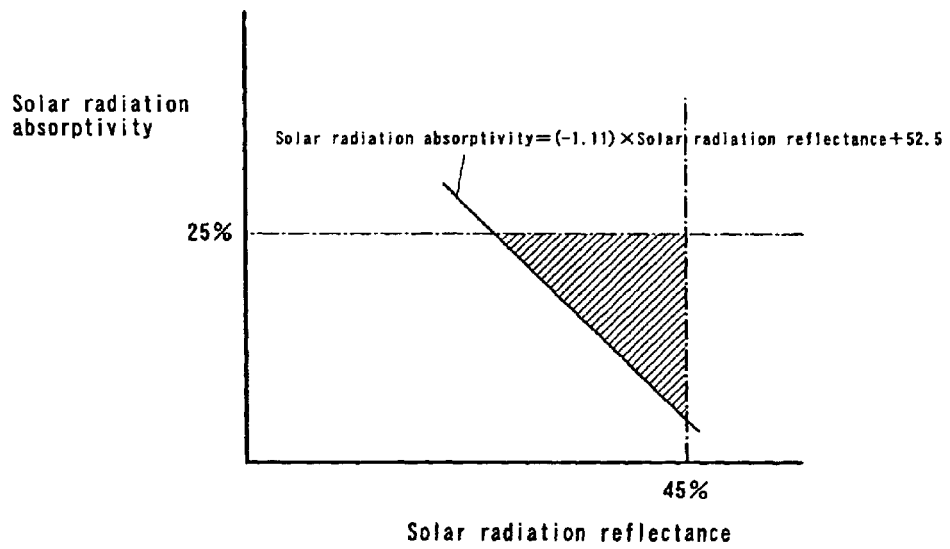
FIG. 4 is a graph showing the relationship between the solar radiation absorptivity and the solar radiation reflectance.

Detailed description will be made below on the present invention. As shown in FIG. 1, in a glass panel 1, an outdoor side sheet of plate glass 2, an indoor side sheet of plate glass 3, and a gap layer 4 are integrated, and the two sheets of plate glass are adhesively sealed all along the peripheries thereof with a low-melting glass unshown in the figure, a metallic solder unshown in the figure, or the like.

A layer of a functional film 5, characterizing the present invention, is formed on the gap layer 4 side of the outdoor side sheet of plate glass 2. In the production of such a glass panel, at the beginning, an outdoor side sheet of plate glass 2 is prepared through forming the functional film 5 on one side surface of a sheet of float glass or the like by sputtering or the like, and spacers 6 are interposed between this sheet of plate glass 2 and the indoor side sheet of plate glass 3. The spacer 6 is made of a material having a compressive strength of $4.9\times10^8$ Pa or more, for example, a stainless steel (SUS304), and it is preferably a solid cylinder having a diameter ranging from 0.3 mm to 1.0 mm and a height ranging from 0.15 mm to 1.0 mm; it is also preferable that the intervals between the individual spacers are of the order of 20 mm. The gap layer 4 is formed between the two sheets of plate glass by adhesively sealing all along the peripheries of the two sheets of plate glass sandwiching the spacers 6 with a low-melting glass, subsequently the pressure in the gap layer 4 is reduced by suction of the air therein, and the gap layer 4 is sealed closely so as to be in a state of displaying an environment having a reduced pressure of 1.33 Pa or less.

The functional film 5 is a laminated film having a structure wherein a dielectric layer and a metal layer constitute the main layers, for example, a laminated film composed as a first dielectric layer/a metal layer/a second dielectric layer, or the like. Silver is recommended as the metal for use in the metal layer among these layers; alternatively, silver doped with palladium, gold, indium, zinc, tin, aluminum, copper, or the like can also be preferably used. Additionally, the thickness of the metal layer is preferably from 10 to 18 nm.

As the main components of the material used in the dielectric layers, one or more than one oxides, selected from the oxides of zinc, tin, titanium, indium, and bismuth, can be used; additionally, for at least one of the dielectric layers, one or more than one layers selected from the nitride layers and the oxynitride layers, containing the metals of Si, Al, and Ti, can be used. Additionally, the thickness of the first dielectric layer is preferably from 10 to 90 nm, while the total thickness sum of the second dielectric layer is preferably from 10 to 60 nm.

Additionally, when a dielectric layer is formed by the reactive sputtering, a sacrifice layer may be inserted into the interface more distant from the sheet of plate glass, of the interfaces between the dielectric layers and the metal layer, which sacrifice layer consists of the metals or metal oxides that themselves are oxidized to prevent the deterioration (oxidation) of the metal layer being formed. As the specific examples of the materials to constitute the sacrifice layer, there can be cited such metals as titanium, zinc, silicon, aluminum, zinc/tin alloy, and niobium, and the oxides of these metals. Additionally, the thickness of the sacrifice layer is appropriately from 1 to 5 nm. Accordingly, for example, the following constitutions are involved: Glass/ZnO/Ag/Ti/ZnO/SiNx; Glass/ZnO/Ag/Ti/SiNx/ZnO/SiNx; Glass/ZnO/Ag/Ti/SiNx; and the like.

Additionally, a layer of $SiO_2$ may be formed as the uppermost layer, that is, the layer which is farthermost from the surface of the sheet of plate glass. By forming the $SiO_2$ layer as the uppermost layer, the foam formation can be suppressed which is caused by the reaction of the functional film 5 with the adhesive sealing material such as a low-melting glass and a metal solder, in the adhesive sealing process; and furthermore the intrusion of the adhesive sealing material into the gap layer 4 between the sheets of plate glass 2 and 3 can be easily suppressed. Additionally, a layer of $SiO_2$ may be formed as the undermost layer, that is, the layer which is nearest to the surface of the sheet of plate glass. By forming the $SiO_2$ layer as the undermost layer, the effects of the surface state of the sheet of plate glass on the layers upper than the undermost layer can be prevented, and hence the stable formation of film is made possible.

EXAMPLES

Description will be made below on the performance of the heat insulating/heat shielding glass panel of the present invention with reference to the specific examples and comparative examples.

Example 1

The sheet of plate glass 2 of 3 mm in thickness with the functional film 5 formed thereon and having the film constitution, Glass/ZnO/Ag/Ti/ZnO+SiNx (ZnO+SiNx having ZnO as the main component, and containing SiNx) was cut to a predetermined size, a sheet of float glass of 3 mm in thickness was prepared as the indoor side sheet of plate glass 3, the solid cylinder stainless spacers 6 of 0.5 mm in diameter and 0.2 mm in height were interposed between these two sheets of plate glass, the two sheets of plate glass were adhesively sealed all along the peripheries thereof with a low-melting glass, and subsequently the gap layer was depressurized and evacuated to yield a glass panel 1.

The glass panel finished as described above was subjected to evaluation under the conditions described below.

The condition (1): the conditions of an experimental house was set to simulate the summertime solar radiation conditions that the solar radiation heat flux was 700 kcal/m$^2$ h, the temperature outside the room was 30° C., and the temperature inside the room was 25° C., and the coefficient of heat transmission (kcal/m$^2$ h° C.) was measured. Additionally, the solar radiation heat gain ratio was obtained by the calculation based on JIS R3106 from the results of the optical property measurements of the indoor side sheet and outdoor side sheet of plate glass. Furthermore, the warping of the panel was examined by visual inspection. The results thus obtained are listed in Table 1.

Examples 2 to 6

Examples 2 to 6 were the same as Example 1 in the layer constitution and the materials of the individual layers, but the layer thickness values were varied from those in Example 1.

Comparative Examples 1 and 2

A sheet of plate glass with a functional film formed thereon and having the emissivity of 0.15 was used for the indoor side sheet of plate glass, a sheet of heat ray absorbing glass was used for the outdoor side sheet of plate glass, and a glass panel was produced by the same method as that in Example 1. The evaluation results for the glass panels are shown in Table 1.

The warping degrees were measured with the solar radiation flux of 700 [kcal/m$^2$·h], the temperature outside the room of 30° C., and the temperature inside the room of 25° C.

In examples 1 to 5, the solar radiation heat gain ratios were 0.49 or less, and the warping degrees were also small. In example 6, the solar radiation heat gain ratio was 0.51 or less, and the warping degree was also small. On the contrary, in comparative example 1, the solar radiation heat gain ratio did not satisfy the required value; the solar radiation reflectance was low, accordingly the solar radiation transmittance became high, and the solar radiation heat gain ratios exceeded the required value. Additionally, the visible light reflectance also became high, and consequently the dazzling appearance was enhanced unpreferably.

Comparative example 2 had a slightly large warping degree, but the visible light transmittance became so low that the transmittance did not reach a level suitable for actual use as an architectural glass panel.

TABLE 1

| | Examples and comparative examples | | | | | | | | |
|---|---|---|---|---|---|---|---|---|---|
| | Ex. 1 | Ex. 2 | Ex. 3 | Ex. 4 | Ex. 5 | Ex. 6 | Com.ex. 1 | Com.ex. 2 | (Prior art) |
| Thickness of first dielectric layer [nm] | 30 | 10 | 90 | 60 | 30 | 20 | 30 | 40 | Outdoor side sheet of glass = heat ray absorbing glass |
| Metal layer [nm] | 15 | 10 | 14 | 15 | 18 | 13 | 8 | 25 | |
| Sacrifice layer [nm] | 2 | 2 | 2 | 2 | 2 | 2 | 2 | 2 | |
| Second dielectric layer [nm] | 50 | 10 | 50 | 60 | 50 | 40 | 80 | 80 | |

TABLE 1-continued

| | Examples and comparative examples | | | | | | | | |
|---|---|---|---|---|---|---|---|---|---|
| | Ex. 1 | Ex. 2 | Ex. 3 | Ex. 4 | Ex. 5 | Ex. 6 | Com.ex. 1 | Com.ex. 2 | (Prior art) |
| Solar radiation reflectance (incident on film surface side) [%] | 37.0 | 40.1 | 37.3 | 36.6 | 44.5 | 34.7 | 20.8 | 63.3 | Indoor side sheet of glass = low emissivity glass |
| Solar radiation absorptivity (incident on film surface side) [%] | 13.7 | 10.7 | 13.1 | 13.7 | 13.2 | 13.3 | 14.9 | 12.3 | |
| Satisfaction of inequality in claim 1 | ○ | ○ | ○ | ○ | ○ | ○ | x | ○ | |
| Satisfaction of inequality in claim 2 | ○ | ○ | ○ | ○ | ○ | x | x | ○ | |
| Visible light reflectance (incident on glass surface) [%] | 13.7 | 15.4 | 18.7 | 19.0 | 18.5 | 8.5 | 23.0 | 57.6 | |
| Visible light transmittance [%] | 78.4 | 74.0 | 73.1 | 73.2 | 72.8 | 82.8 | 71.1 | 33.7 | |
| Solar radiation heat gain ratio | 0.48 | 0.48 | 0.48 | 0.48 | 0.42 | 0.50 | 0.62 | 0.26 | 0.47 |
| Warping degree | Small | Small | Small | Small | Small | Small | Small | Medium | Large |
| Coefficient of heat transmission [kcal/m$^2$h° C.] | 1.1 | 1.1 | 1.1 | 1.1 | 1.0 | 1.1 | 1.2 | 1.0 | 1.3 |

As above, examples have been described, but the present invention is not limited to the above examples. For example:

(1) The glass panel of the present invention can be used not only for the architectural use but also for a variety of uses in the cases suffering the solar radiation, such as the means of transportation (automobile windowpanes, rail car windowpanes, marine vessel windowpanes), and the practicable windowpane and the wall material of either a refrigerator or a heat insulating apparatus arranged outdoors.

(2) The above described sheet of plate glass is not limited to the sheets of plate glass described in the aforementioned examples of 3 mm in thickness, but it may be a sheet of plate glass having another thickness, or a combination of the sheets of plate glass different from each other in thickness. Additionally, the type of plate glass can be optionally selected; for example such types of plate glass include figured glass, frosted glass (the surface thereof is processed so as to be provided with the function to diffuse the light), wire glass, line wire glass, reinforced glass, double strength glass, low reflectance plate glass, high transmittance plate glass, ceramic printed glass, plate glass provided with such functions as ultraviolet absorption and heat ray reflection, and the combinations thereof.

Additionally, as for the glass composition, the types of plate glass may include borosilicate glass, aluminosilicate glass, various types of polycrystallized glass, and the like.

(3) The above described spacer is not limited to the stainless steel spacer described in the above examples; it may be a spacer made of, for example, a metal such as iron, copper, aluminum, tungsten, nickel, chromium, titanium, and the like; an alloy such as carbon steel, chromium steel, nickel steel, nickel-chromium steel, manganese steel, chromium-manganese steel, chromium-molybdenum steel, silicon steel, brass, solder, duralumin, and the like; ceramics; or glass; in a word, the spacer material has only to be a material which is rigid enough for the two sheets of plate glass not to come into contact with each other on suffering an external force.

Additionally, the shape of the spacer is not limited to the solid cylinder, but it may be a sphere or a prism, and the intervals between the individual spacers can be appropriately modified.

(4) The material forming the peripheral sealed portion is not limited to the low-melting glass described in the above examples, but it may be a metal solder, and the like.

Industrial Application

The heat insulating/heat shielding glass panel of the present invention can achieve the high heat insulating performance and high heat shielding performance, by forming a functional film on the gap layer side surface of the outdoor side sheet of plate glass, in which film the emissivity is 0.20 or less, the solar radiation reflectance is 45% or less, the solar radiation absorbance is 25% or less, and the following relation holds: the solar radiation absorptivity≧(−1.02)×the solar radiation reflectance+48.5; and furthermore, it is impossible that only the outdoor side sheet of plate glass undergoes the thermal expansion due to the heat ray absorption, and hence there is no fear that the warping due to the difference in thermal expansion between the two sheets of plate glass occurs on the basis of the same principle as that operating in bimetal.

Accordingly, it is not necessary to use a heat ray absorbing glass as the outdoor side sheet of plate glass, and a plate glass commonly used for windowpanes such as float glass suffices for the outdoor side sheet of plate glass. It is also unnecessary to add a special function to the indoor side sheet of plate glass, and hence a plate glass commonly used for windowpanes such as float glass can be used for the indoor side sheet of plate glass, in the same manner as that for the outdoor side sheet.

What is claimed is:

1. A heat insulating/heat shielding glass panel constituted so as to partition an indoor space and an outdoor space by forming a gap layer with a predetermined spacing between a pair of sheets of plate glass, forming a sealed periphery portion all along the peripheries of said two sheets of plate glass, and sealing said gap layer into a reduced pressure state characterized in that a functional film having emissivity of 0.20 or less is formed on the surface, in contact with said gap layer, of the outdoor side sheet of plate glass of said sheets of plate glass; the solar radiation reflectance of the sheet of plate glass with said functional film formed thereon is 45% or less; the solar radiation absorptivity of the sheet of plate glass with said functional film formed thereon is 25% or less; and the following relation holds: the solar radiation absorptivity≧(−1.02)×the solar radiation reflectance+48.5.

2. A heat insulating/heat shielding glass panel constituted so as to partition an indoor space and an outdoor space by forming a gap layer with a predetermined spacing between a pair of sheets of plate glass, forming a sealed periphery portion all along the peripheries of said two sheets of plate glass, and sealing said gap layer into a reduced pressure state characterized in that a functional film having emissivity of 0.20 or less is formed on the surface, in contact with said gap layer, of the outdoor side sheet of plate glass of said sheets of plate glass; the solar radiation reflectance of the sheet of plate glass with said functional film formed thereon is 45% or less; the solar radiation absorptivity of the sheet of plate glass with said functional film formed thereon is 25% or less; and the following relation holds: the solar radiation absorptivity$\geq$(−1.11)×the solar radiation reflectance+52.5.

3. The heat insulating/heat shielding glass panel according to claim 1, characterized in that said functional film is a laminated film produced by forming in order a first dielectric layer, a metal layer, and a second dielectric layer; the thickness of said first dielectric layer is form 10 to 90 nm; the thickness of said metal layer is from 10 to 18 nm; and the thickness of said second dielectric layer is from 10 to 60 nm.

4. The heat insulating/heat shielding glass panel according to claim 3, characterized in that a main component of said dielectric layers comprises an oxide of one type of metal or more than one types of metals selected from the group consisting of Zn, Sn, Ti, In, and Bi; and at least one of the dielectric layers contains a nitride layer or an oxynitride layer, containing one or more than one types of metals selected from the group consisting of Si, Al, and Ti.

5. The heat insulating/heat shielding glass panel according to claim 3, characterized in that said metal layer is made of Ag or Ag added with Pd.

6. The heat insulating/heat shielding glass panel according to claim 3, characterized in that a sacrifice layer is formed between said metal layer and the second dielectric layer.

7. The heat insulating/heat shielding glass panel according to claim 6, characterized in that said sacrifice layer is made of Ti, Zn, Si, Al, Zn/Sn alloy, or Nb.

8. The heat insulating/heat shielding glass panel according to claim 6, characterized in that the thickness of said sacrifice layer is from 1 to 5 nm.

9. The heat insulating/heat shielding glass panel according to claim 1, characterized in that a $SiO_2$ layer is provided as the undermost layer nearest to the surface of said sheet of plate glass.

10. The heat insulating/heat shielding glass panel according to claim 1, characterized in that a $SiO_2$ layer is provided as the uppermost layer farthermost from the surface of said sheet of plate glass.

11. The heat insulating/heat shielding glass panel according to claim 2, characterized in that said functional film is a laminated film produced by forming in order a first dielectric layer, a metal layer, and a second dielectric layer, the thickness of said first dielectric layer is form 10 to 90 nm; the thickness of said metal layer is from 10 to 18 nm; and the thickness of said second dielectric layer is from 10 to 60 nm.

12. The heat insulating/heat shielding glass panel according to claim 2, characterized in that a $SiO_2$ layer is provided as the undermost layer nearest to the surface of said sheet of plate glass.

13. The heat insulating/heat shielding glass panel according to claim 2, characterized in that a $SiO_2$ layer is provided as the uppermost layer farthermost from the surface of said sheet of plate glass.

* * * * *